United States Patent [19]

Forster

[11] Patent Number: 4,565,117
[45] Date of Patent: Jan. 21, 1986

[54] AXIAL PISTON MOTORS HAVING A FRICTION BRAKE

[75] Inventor: Franz Forster, Muhlbach, Fed. Rep. of Germany

[73] Assignee: Linde Aktiengesellschaft, Wiesbaden, Fed. Rep. of Germany

[21] Appl. No.: 279,948

[22] Filed: Jul. 2, 1981

[30] Foreign Application Priority Data

Jul. 29, 1980 [DE] Fed. Rep. of Germany ....... 3028774

[51] Int. Cl.⁴ .............................................. F15B 15/26
[52] U.S. Cl. ......................................... 92/20; 91/473; 92/24; 92/57; 92/71; 417/223
[58] Field of Search ................ 91/473, 499; 180/308; 188/170; 74/411; 92/12.2, 20, 24, 57, 71; 417/223

[56] References Cited

U.S. PATENT DOCUMENTS

| | | | |
|---|---|---|---|
| 1,156,433 | 10/1915 | Pratt | 92/12.2 |
| 1,763,397 | 6/1930 | Hutchinson | 92/12.2 |
| 2,307,214 | 1/1943 | Gollmer | 92/12.2 |
| 3,117,420 | 1/1964 | Young | 92/12.2 |
| 3,292,457 | 12/1966 | Horowitz | 74/411 |
| 3,375,756 | 4/1968 | Bienaime | 92/24 |
| 3,439,766 | 4/1969 | Dence | 180/308 |
| 3,643,433 | 2/1972 | Widmaier | 91/473 |
| 3,680,666 | 7/1972 | Sommer | 188/170 |
| 3,831,718 | 7/1974 | Muller | 188/170 |
| 3,863,038 | 1/1975 | Kreitner | 188/170 |
| 4,201,279 | 5/1980 | Fukui | 180/308 |

FOREIGN PATENT DOCUMENTS

| | | | |
|---|---|---|---|
| 2130513 | 6/1971 | Fed. Rep. of Germany | 91/473 |
| 1625106 | 11/1975 | Fed. Rep. of Germany | |
| 1261692 | 1/1972 | United Kingdom | 91/473 |

Primary Examiner—Abraham Hershkovitz
Attorney, Agent, or Firm—Ziesenheim, Beck & Alstadt Buell

[57] ABSTRACT

An axial piston motor is provided having a mechanical friction brake incorporated in the driving flange, thereby maintaining the axial length of the motor the same as motors without a mechanical friction brake.

7 Claims, 1 Drawing Figure

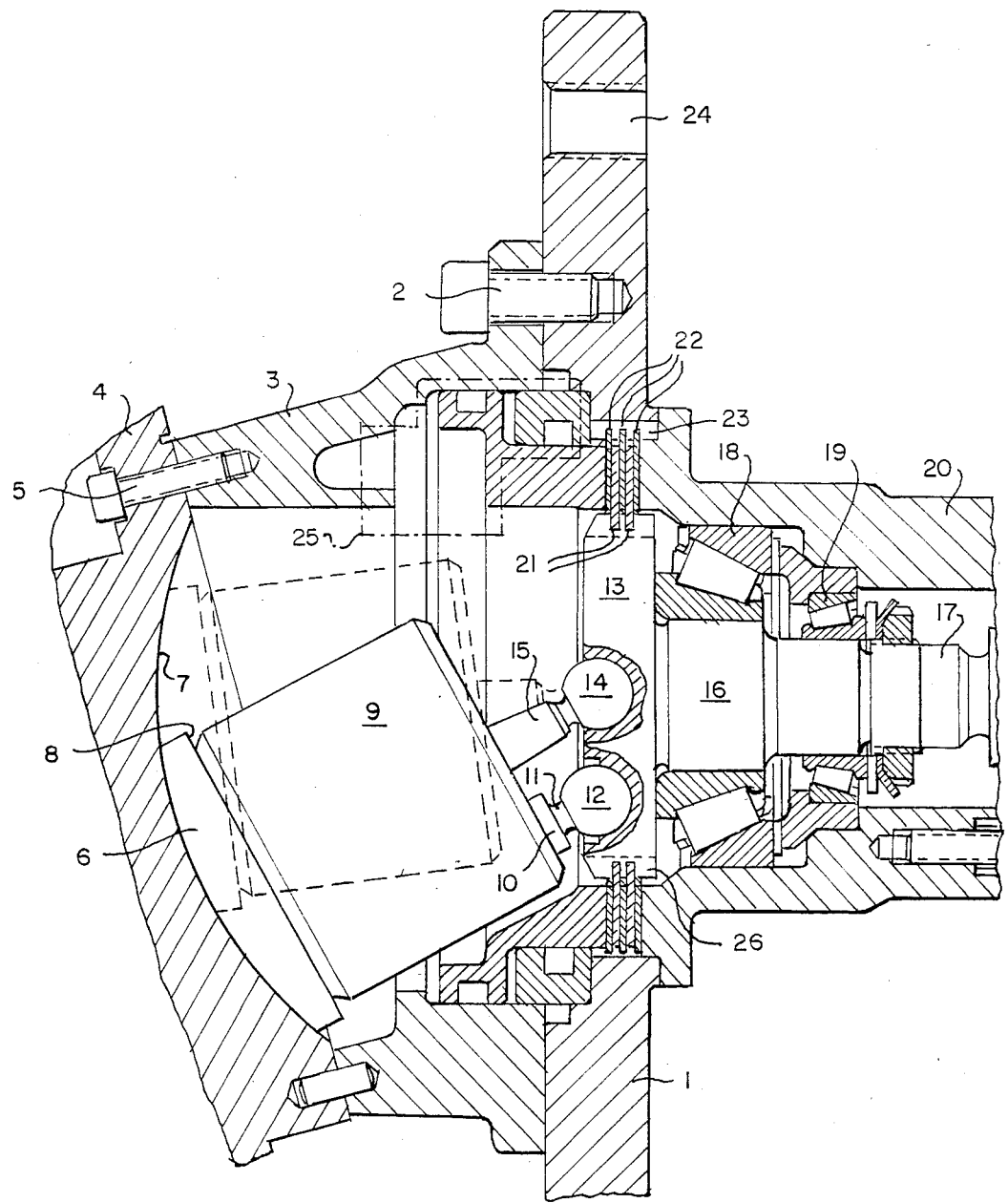

AXIAL PISTON MOTORS HAVING A FRICTION BRAKE

This invention relates to axial piston motors having a brake and particularly to axial piston motors with either constant displacement or variable displacement having a driving shaft combined with a mechanical friction brake.

Axial piston motors are well-known in the art in both constant and variable displacement forms. While it is possible to brake such motors driven by a gear unit with a hydrostatic drive unit by adjusting the pump of the drive unit in the direction zero stroke, so that a smaller feed stream flows to the motor, such that a braking effect is developed in the motor, such braking is frequently insufficient and it is frequently expedient to provide a friction brake, at least as a locking brake, possibly also as an additionally actuatable or as the operating brake.

In axial piston motors of the said type known to date, the driving flange shaft is supported in two bearings and in addition to them a brake is installed on this shaft or connected to it and, in the axial direction and connected to the brake, there is a connection for connecting the driven part, e.g., a planetary gear unit. This results in a very great construction length. However, there is frequently only a limited space available in the axial direction; consequently, such an arrangement is quite disadvantageous and undesirable.

Arrangements of the said type are used, for example, for wheel hub drives in which the motor is located in an axial carrier section connected with the vechicle frame, whereby a planetary gearing is driven by the drive shaft of the axial piston motor and in turn drives the wheel hub supported on the axle carrier section.

The invention proposes a unit consisting of an axial piston motor and a mechanical brake, the prolongation of which in the direction of the axis of rotation is as short as possible.

For solving this problem, the invention provides that the brake is incorporated in the drive flange. Because the driving flange is present in any case due to the motor construction and must have a certain axial extension, no additional construction space in the axial direction is required due to the present arrangement of the brake. The motor with brake requires no greater incorporation space in the axial direction than the motor without a brake, for which essentially the same structural components can be used. Another advantage is that a brake arranged around the driving flange as provided by this invention has a relatively large diameter due to this arrangement, which is also available in this zone of the assembly, such that the brake is required to absorb only a relatively small moment at a higher friction velocity as compared with a friction brake located directly on the drive shaft at its output end and matched to the shaft diameter. This is a very real advantage in terms of brake efficiency.

The use of a multiple-disc brake, the rotating discs of which have teeth facing the inside, which are capable of engaging the teeth present in the outside of the drive flange, are particularly expedient. This results in not only a favorable brake construction with little wear, the state of wear of which can be checked from the outside, but the same drive shafts can be used as are used for twin pump assemblies in which the driving flanges have teeth on their outer periphery and the teeth of the driving flanges of the two pumps mesh directly or through an intermediate gear. Even if a different tooth design is used for the teeth serving for the drives in the twin pumps and for the teeth for engagement of the discs with respect to a different task, at least the same blank can be used. Because a compression force must be applied in the axial direction for actuating multiple-disc brakes, it is also readily possible in such an arrangement to install the control mechanism (springs and/or cylinders and possibly other mechanical elements) alongside the space in which the cylindrical drum containing pump cylinders and pistons lies. Because the cylindrical drum axis in motors of this type encloses an angle with the drive shaft axis, there is also sufficient space in addition to the cylindrical drum axis for installing the control elements without enlarging the space required for the assembly.

It should be noted that providing the driving flange with external teeth and the installing of a planetary gear drive around the driving flange are already known (DE-PS 16 25 106).

An assembly of the above type is also very well suited for a wheel hub drive of the said type, in which a wheel hub is driven by the drive shaft of the hydraulic motor through a planetary reduction gear drive.

An implementation example of the object of invention is shown in cross section in the accompanying drawing.

Referring to the drawing I have illustrated a housing 3 of an axial piston motor bolted on a flange carrier section 1 by means of several bolts 2. The bottom of the housing 4 is bolted to the housing 3 by means of bolts 5, in which case control elements (not shown in the drawing) for swinging the swivelling slide 6 are located in the housing bottom 4. The swivelling slide 6 has a cylindrical surface that is capable of sliding along a concave surface 7. The cylindrical drum 9, in which the pistons 10 are capable of sliding, lies against the swivelling slide 6 on the control reflector surface 8. A connecting rod 11 is articulated in each piston 10 and it is supported by means of a spherical head 12 in a matching recess of the driving flange 13. A spherical head 14 is supported in the axis of rotation of the driving flange 13 and is connected with a central pin 15, on which the cylindrical drum 9 can slide lengthwise, but cannot rotate with respect thereto.

The driving flange 13 consists of a structural component with the shaft 16, which has a free connection 17, to which the sun gear of a planetary drive can for example be connected. The drive shaft 16, 17 is supported in two conical roller bearings, which in turn are supported in an axle carrier body 20, which in turn is connected by connecting elements (not shown in the drawings) with the flange carrier section 1. All of this is conventional.

The driving flange 13 has on its outer periphery teeth 26 in which the brake discs 21 engage. Brake discs 22, lying between two brake discs 21, have teeth on their outer periphery, which engage the teeth 23 in the flange carrier section 1. The flange carrier section 1 can be connected with a vehicle chassis by means of bolts (conventional and thus not shown in the drawing) passing through the boreholes 24 (only one of which is shown in the drawing).

The control elements for the multiple-disc brake 21, 22 are placed in the space 25 indicated by a dot-dash line. As illustrated, the control element is a hydraulic piston urging the brake discs together against a surface on the housing to provide a caliper action on the discs.

The inner rings of the roller bearings (not shown in the drawing) rest against the axle hub carrier 20 and they support either the wheel hub or the planetary gear drive or both, depending upon the structure in which they are used.

The assembly consisting of a motor with brake can be bolted by means of the flange carrier section 1 not only on a vehicle chassis, but can also be bolted at will at other sites on mobile or stationary machines where the use of such an assembly is called for, precisely as is a conventional axial piston motor without a brake and requiring no additional space.

In the foregoing specification I have set out certain preferred practices and embodiments of my invention, however, it will be understood that this invention may be otherwise embodied within the scope of the following claims.

I claim:

1. In an axial piston motor having a cylindrical drum carrying at least one cylinder passage parallel to the axis of the drum, a reciprocable piston in each cylinder passage, connecting rod means on one end of each said piston, a driving flange on a drive shaft enclosed within a motor housing surrounding said drum, said flange being operatively connected to said drum by way of the connecting rod means whereby rotation of the driving flange corresponds with the reciprocation of the at least one piston, the improvement comprising brake means between the housing and driving flange acting on the periphery of the driving flange.

2. An axial piston motor as claimed in claim 1 wherein the brake means includes at least one brake disc having an inner annulus carrying radial teeth, the driving flange has radial teeth on the periphery engaged by said teeth on the inner annulus of at least one brake disc, and brake engaging means in the housing forming a part of the brake means frictionally engageable on said brake disc.

3. An axial piston motor as claimed in claim 2 wherein there are provided a plurality of brake discs on the driving flange.

4. An axial piston motor as claimed in claim 1 wherein the brake means includes at least one brake disc having an inner annulus carrying radial teeth, the driving flange has radial teeth on the periphery engaged by said teeth on the inner annulus of at least one first brake disc, the housing has radially inwardly extending teeth opposite the teeth on the driving flange engaged by teeth on the outer periphery of at least one second disc axially aligned with the first disc, and brake engaging means forming a part of the brake means acting on said first and second discs to cause them to engage in side-by-side friction contact.

5. An axial piston motor as claimed in claim 4 wherein there are provided a plurality of each of said first and second discs.

6. An axial piston motor as claimed in claim 1, or 2, or 3, or 4, or 5 where the brake means includes a brake engaging means in the form of a hydraulically actuated caliper means engaging at least one brake disc.

7. An axial piston motor as claimed in any one of claims 1 to 5 wherein the brake means includes a brake engaging control mechanism in the housing acting parallel to the axis of the drive shaft.

* * * * *